United States Patent [19]
Aiga et al.

[11] Patent Number: 5,953,857
[45] Date of Patent: Sep. 21, 1999

[54] METHOD FOR CONTROLLING PLANT GROWTH

[75] Inventors: Ichiro Aiga, Osaka-fu; Katsusuke Murakami, Hyogo-ken; Shuhei Ikado, Kanagawa-ken; Ryu Nakamura, Kanagawa-ken; Ryu Oi, Kanagawa-ken; Kazuhiro Seino, Kanagawa-ken; Keisuke Takuma, Kanagawa-ken, all of Japan

[73] Assignee: Mitsui Chemicals, Inc., Tokyo, Japan

[21] Appl. No.: 08/888,282

[22] Filed: Jul. 3, 1997

Related U.S. Application Data

[62] Division of application No. 08/610,548, Mar. 6, 1996, abandoned.

[30] Foreign Application Priority Data

| Mar. 17, 1995 | [JP] | Japan | 7-058436 |
| Mar. 17, 1995 | [JP] | Japan | 7-058437 |
| Mar. 17, 1995 | [JP] | Japan | 7-058439 |

[51] Int. Cl.⁶ .................................................. A01G 17/14
[52] U.S. Cl. .................................. 47/29; 47/26; 47/28.1; 47/31; 47/32; 524/88; 524/242
[58] Field of Search ........................... 47/26, 28.1, 29, 47/31, 32, 32.1, DIG. 6, DIG. 11, 58.23; 524/88, 242

[56] References Cited

U.S. PATENT DOCUMENTS

| 2,399,355 | 4/1946 | Klein | 552/297 |
| 2,687,939 | 8/1954 | Sartori | 552/297 |
| 3,291,746 | 12/1966 | Donoian et al. | 524/88 |
| 3,352,058 | 11/1967 | Brant | 47/58 |
| 3,708,457 | 1/1973 | Needham et al. | 524/88 |
| 3,911,620 | 10/1975 | Glatti . | |
| 3,945,979 | 3/1976 | Kobayashi et al. | 524/242 |
| 4,001,169 | 1/1977 | Cheetham et al. | 524/242 |
| 4,791,023 | 12/1988 | Suzuki et al. . | |
| 4,842,781 | 6/1989 | Nishisawa et al. | 524/242 |
| 4,895,904 | 1/1990 | Allingham | 47/29 |
| 5,684,069 | 11/1997 | Auslander | 524/88 |

FOREIGN PATENT DOCUMENTS

| 77496 | 4/1983 | European Pat. Off. | 47/DIG. 6 |
| 52-55724 | 5/1977 | Japan . | |
| 52-117738 | 10/1977 | Japan . | |
| 61-134702 | 6/1986 | Japan . | |
| 61-170322 | 8/1986 | Japan . | |
| 1-132648 | 5/1989 | Japan . | |
| 2-283212 | 11/1990 | Japan . | |

OTHER PUBLICATIONS

Patent Abstracts of Japan, vol. 017, No. 653 (E–1469), Dec. 3, 1993 & JP–A–05217556 (Matsushita Electric Ind. Co. Ltd.) Aug. 1993 *Abstract*.

Patent Abstracts of Japan, vol. 016, No. 544, (C–1004), Nov. 13, 1992 & JP–A–04–207127 (Matsushita Electric Ind. Co. Ltd.) Jul. 29, 1992 *Abstract*.

Katsuke Murakami et al, "A Discussion on the Development of Artificial Radiant Sources for Plant Growth", vol. 30, No. 4, pp. 135–141 (1992). *Biological Environment Control.*

Katsumi Inada, Agriculture and Horticulture, vol. 69, No. 9, pp. 986–990 (1994).

*Primary Examiner*—Veronica P. Hoke
*Attorney, Agent, or Firm*—Burns, Doane, Swecker & Mathis, L.L.P.

[57] ABSTRACT

A method for controlling plant growth by exposing plants to light passing through a covering material comprising a base material containing a colorant. The type and content of the colorant are chosen to provide a photosynthetically effective photon flux (PPF) transmittance of 50% or greater when light is passed through the covering material, and an A value suitable for the purpose of promoting or retarding the growth of plants irradiated with light transmitted by the covering material, the A value being defined by the following equation:

$$A = R/Fr$$

where R is the photon flux of red light in the wavelength range of 600 to 700 nm and Fr is the photon flux of far red light in the wavelength range of 700 to 800 nm.

15 Claims, No Drawings

METHOD FOR CONTROLLING PLANT GROWTH

This application is a divisional of application Ser. No. 08/610,548, filed Mar. 6, 1996 now abandonded.

BACKGROUND OF THE INVENTION

1. Field of the Invention

This invention relates to novel covering materials for controlling the growth of plants which are highly valuable in large-scale horticulture and private gardening.

2. Description of the Related Art

The primary purpose of the covering materials used in large-scale horticulture and private gardening is to decrease the thermal loss from the inside of the greenhouse atmosphere into the open air (i.e., reduce the rate of ventilation) and thereby achieve proper control of the temperature environment, regulation of the cultivation period, shortening of the time required for cultivation, increase of the number of times of cultivation, and the like. In addition, such covering materials have the effect of shutting out rain and thereby preventing the agricultural chemicals and fertilizers from migrating to the outside of the greenhouse, and also permit carbon dioxide application.

Since primary covering materials are exposed to the open air and sunlight, it is desirable that they have a long lifetime. Moreover, they must have high light transmittance. For this purpose, glass, plastic plates and films have been used. In particular, films have the advantage that they are cheap and can be attached or detached easily. On the other hand, a cheese cloth is frequently used inside the greenhouse for thermal insulation and shading in hot weather.

Thus, the primary function of covering materials currently used for practical purposes is to maintain and control the temperature environment.

As for other functions of covering materials, in response to the rapid progress of research on photomorphogenesis in the 1950s, studies on the utilization of light quality including the control of photomorphogenesis were actively carried out in Japan over a period of more than 20 years up to 1983, under the leadership of the Ministry of Agriculture, Forestry and Fishery. However, no practical result has been obtained as yet (Agriculture and Horticulture, Vol. 69, No. 9, p. 986, 1994).

At present, seedlings produced in seedling production facilities generally tend to be overgrown, and dwarf and robust seedlings are desired. Dwarf seedlings are resistant to natural environmental conditions (survive better in adverse climate) and are also effective in minimizing the lodging of plants and thereby preventing the loss of crop yield. In the cultivation of flowers, flowering plants having a long stalk are highly prized as cut flowers, whereas dwarf plants having large flowers tend to be desired for potted plants. In the cultivation of fruit trees, the dwarfed plants contribute to the improvement of workability. Moreover, in the case of graft seedlings, a uniform internode length is required for cutting by a robot. Thus, the elongation growth of plants affects their commercial value. Chemical regulation with a dwarfing agent or by mechanical retardation (i.e., training and pruning) is currently being exercised, but there is a need for a safer and more convenient method.

On the basis of experiments using artificial light sources, it has conventionally been known that the elongation growth of plants is promoted in a light environment containing a high proportion of far red light. The reason for this is presumed to be that an increase of far red light causes a reduction in r/fr ratio (in which r is the photon flux at 660 nm and fr is the photon flux at 730 nm), the reduced ratio changes the photostationary state of phytochrome, and this result acts as a signal to promote the elongation of plants. On the other hand, it is also known that the elongation of plants is retarded in a light environment containing a high proportion of red light. However, there has been no report dealing with the demonstration of these facts by use of a covering material. For example, films for controlling ultraviolet light and visible light are reported in Japanese Patent Laid-open Nos. 117738/'77, 132648/'89, 283212/'90 and 170322/'86, but there is no statement concerning the influence of far red light, relation with the r/fr ratio, elongation-promoting effect and the like. With regard to films for controlling far red light, their effect on specific types of plants has not been reported at all.

The present inventors have clarified that, in the evaluation, design and selection of an artificial light source for use in plant cultivation, not only the quantity of photosynthetically effective light (i.e., PPF luminous efficiency) but also the ratio of light in the red region to light in the far red region is important from the viewpoint of photomorphogenesis, and have concluded that a light source having high PPF luminous efficiency and a controllable red light/far red light ratio is desirable for plants. Moreover, they have shown that, when the red light/far red light ratio is used as an indicator for morphological control in an artificially illuminated environment for plant cultivation, it is most suitable to use a wavelength band of 600 to 700 nm for red light (R) and a wavelength band of 700 to 800 nm for far red light (Fr). Furthermore, they have made four-wavelength-region emission type fluorescent lamps having high PPF luminous efficiency and three levels of R/Fr ratio by way of trial, and have demonstrated its controlling effect on elongation growth (Murakami et al., Biological Environment Control, Vol. 30, No. 4, pp. 135–141, 1992). However, the use of these artificial light sources requires considerable equipment cost and operating cost (e.g., electric charges). Accordingly, a more inexpensive technique is needed in the existing circumstances.

SUMMARY OF THE INVENTION

It is an object of the present invention to provide a covering material for plant growth control which permits the utilization of natural light (sunlight) and is cheap, easy to handle, and suitable for practical purposes.

As a result of intensive investigations made in order to solve the above-described problems, the present inventors have now found that the growth of plants can be easily controlled by using a covering material to vary the R (photon flux in the wavelength range of 600 to 700 nm as based on standard illuminant D65)/Fr (photon flux in the wavelength range of 700 to 800 nm as based on standard illuminant D65) ratio of the transmitted light striking on the plants. The present invention has been completed on the basis of this finding.

That is, the present invention relates to a covering material for controlling plant growth which comprises a base material containing a colorant, characterized in that the covering material has a photosynthetically effective photon flux (PPF) transmittance of 50% or greater when light is passed therethrough, and an A value chosen so as to promote or retard plant growth, the A value being defined by the following equation:

$$A = R/Fr$$

where R is the photon flux of red light in the wavelength range of 600 to 700 nm and Fr is the photon flux of far red light in the wavelength range of 700 to 800 nm.

Moreover, the present invention also relates to a covering material having a photosynthetically effective photon flux (PPF) transmittance of 50% or greater when light is passed therethrough, and an A value of 0.9 or less chosen to promote plant growth or an A value of 1.3 or greater chosen to retard plant growth.

In recent years, the cultivation of plants from seedlings rather than seeds has become increasingly popular from the viewpoint of agricultural rationalization. In the production of seedlings, it is desired to control the growth of seedlings properly and thereby enhance their commercial value. The covering materials of the present invention enable the growth of plants to be controlled in an inexpensive and easy-to-handle manner, and are hence very important and valuable in seedling production facilities.

Moreover, if a covering material in accordance with the present invention is movably installed over a conventional vinyl house, the growth of plants can be easily controlled to a degree suited for the intended purpose.

Thus, in the large-scale cultivation of leafy vegetables, fruit vegetables, root vegetables, various decorative plants, and fruit trees, the covering materials of the present invention are highly valuable from the viewpoint of quality improvement and labor savings.

DETAILED DESCRIPTION OF THE INVENTION AND PREFERRED EMBODIMENTS

The covering materials of the present invention include covering materials having an A value of 0.9 or less and hence serving to accelerate plant growth, and covering materials having an A value of 1.3 or greater and hence serving to retard plant growth.

In the present invention, the A value is adjusted to 0.9 or less by using a colorant having an absorption maximum between 600 and 700 nm. On the other hand, the A value is adjusted to 1.3 or greater by using a colorant having an absorption maximum between 700 and 900 nm, preferably between 700 and 800 nm.

Moreover, in order to achieve a PPF transmittance of 50% or greater, there is used a colorant having high absorption selectivity, i.e., exhibiting sharp absorption in the desired wavelength range but little absorption in other wavelength ranges. The PPF transmittance and A value as used herein are calculated on the basis of standard illuminant D65. From the viewpoint of utility, it is a matter of course that the colorants used in the covering materials of the present invention should desirably have high durability.

The covering materials of the present invention may have a photosynthetically effective photon flux (PPF) transmittance of 50% or greater when light is passed therethrough, and an A value of 0.9 or less, or of 1.3 or greater. The A value may be more preferably selected from the range of 0.3 to 0.9 for growth promotion or the range of 1.3 to 3.0 for growth retardation. Typical examples thereof include (1) a resin film or resin plate comprising a high polymer resin in which a colorant having the above-described properties is dispersed or dissolved, (2) a resin plate, glass plate or resin film which is coated with a coating composition containing such a colorant, (3) a resin film, resin plate or glass plate to which a resin film containing, or coated with, such a colorant is bonded, and (4) a resin film, resin plate or glass plate to which another resin film, resin plate or glass plate is bonded with the aid of an adhesive containing such a colorant.

When the A value is adjusted to 0.9 or less, the resulting covering material serves to promote the growth of plants. On the other hand, when the A value is adjusted to 1.3 or greater, the resulting covering material serves to retard the growth of plants. More preferably, the A value is 0.8 or less for the purpose of promoting plant growth and 1.4 or greater for the purpose of retarding plant growth. Still more preferably, the A value is 0.7 or less for the purpose of promoting plant growth and 1.5 or greater for the purpose of retarding plant growth.

In either case, the transmittance of light outside the controlled wavelength range should preferably be as high as possible. Specifically, the photosynthetically effective photon flux (PPF) transmittance in the wavelength range of 400 to 700 nm should preferably be 50% or greater, more preferably 65% or greater, and still more preferably 70% or greater. If it is less than 50%, photosynthesis in plants will be inhibited, resulting in overgrown immature plants having little chlorophyll.

As used herein, the term "promotion of plant growth" refers to an accelerated elongation of the plant height, stem length, internode length and the like; a decrease in the content of nutrients (e.g., chlorophyll, vitamins and proteins) per unit volume, attendant on the accelerated elongation; the accelerated growth of lateral branches; accelerated flowering; early harvesting caused by an acceleration of vegetative growth; an increase in initial yield; and the like. On the other hand, the term "retardation of plant growth" refers to the dwarfing of plants resulting from a retarded elongation of the plant height, stem length, internode length and the like; an increase in the content of nutrients (e.g., chlorophyll, vitamins and proteins) per unit volume with a thick and strong trunk, attendant on the dwarfing; the retarded growth of lateral branches; late harvesting caused by a retardation of vegetative growth; and the like.

The term "covering" as used herein means the interception of light by surrounding plants with a covering material on all sides or on at least one side where light is admitted.

The term "light" as used herein refers to natural light or light from an artificial light source. Although the use of natural light is advantageous from the viewpoint of cost, it is a matter of course that the present invention can also be applied to the use of an artificial light source. Moreover, reflected light may also be used. That is, the growth of plants may be controlled by placing a reflector on the inside or outside of a covering material so that reflected light having a wavelength distribution controlled by the covering material will strike the plants.

The base material used in the present invention preferably comprises a resin which can be formed into a plate or film having as high transparency as possible. Specific examples of such resins include vinyl compounds and addition polymers of vinyl compounds, such as polyethylene, polyacrylic acid, polymethacrylic acid, polyacrylates, polymethacrylates, polyvinyl acetate, polyacrylonitrile, polyvinyl chloride and polyvinyl fluoride; copolymers of vinyl compounds or fluorine-containing compounds, such as polyvinylidene chloride, polyvinylidene fluoride, polyvinylidene cyanide, vinylidene fluoride/trifluoroethylene copolymer, vinylidene fluoride/tetrafluoroethylene copolymer, vinylidene cyanide/vinyl acetate copolymer and vinyl acetate/ethylene copolymer (EVA); fluorine-containing compounds such as polytrifluoroethylene, polytetrafluoroethylene and polyhexafluoropropylene; polyamides such as nylon 6 and nylon 66; polyimides; polyurethanes; polypeptides; polyesters such as polyethylene terephthalate; polycarbonates; polyethers such as polyoxymethylene, polyethylene oxide and polypropylene oxide; epoxy resins; polyvinyl alcohol; and polyvinyl butyral. Especially preferred are general-purpose hard resins such as polyethylene terephthalate, polycarbonates and polymethyl methacrylate, and agricultural soft resins such as polyvinyl chloride, polyvinyl acetate, polyethylene and vinyl acetate/ethylene copolymer (EVA).

The colorant used to adjust the A value to 0.9 or less should preferably be one having an absorption maximum between 600 and 700 nm. Specific examples thereof include, but are not limited to, the following colorants:

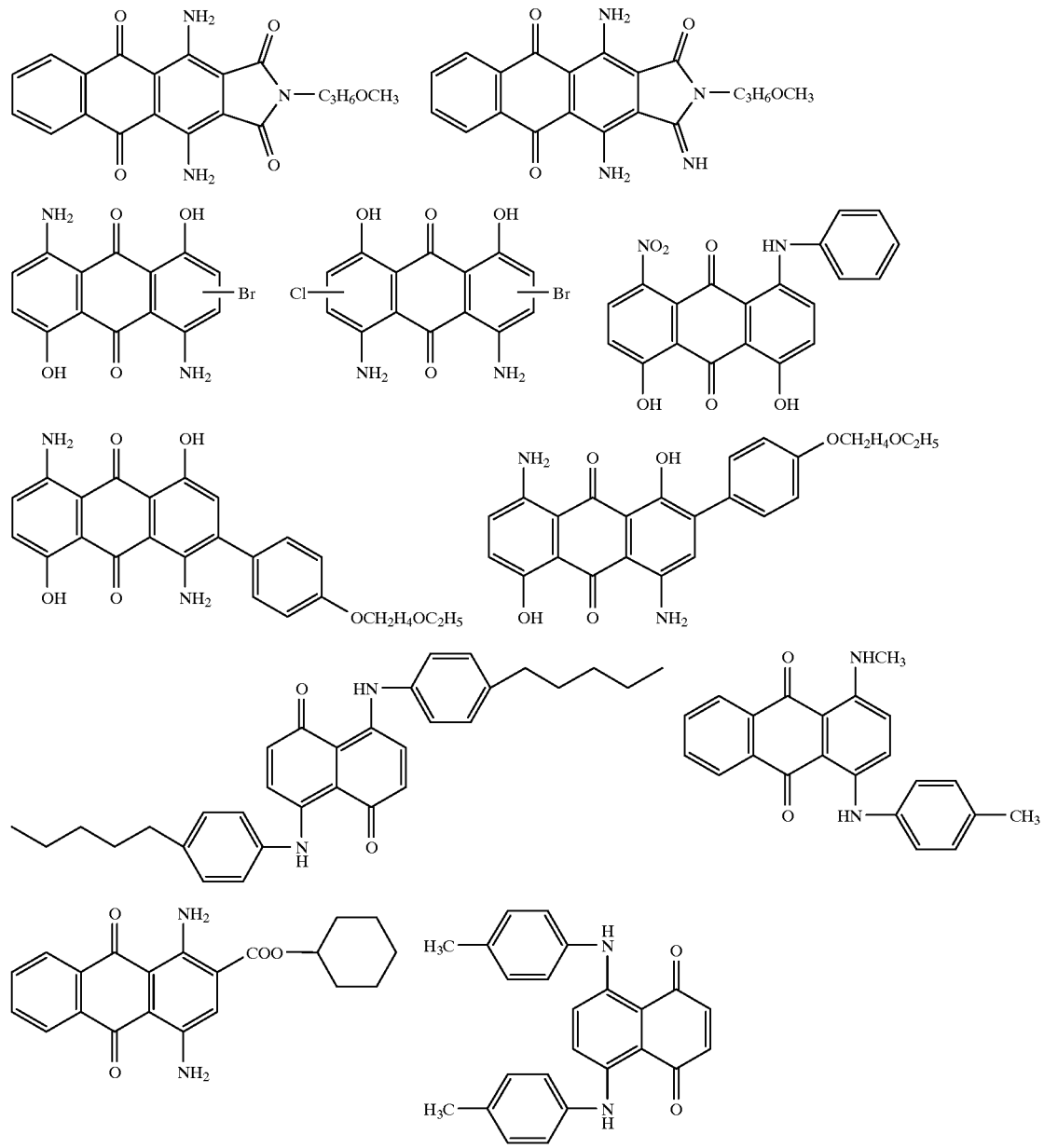

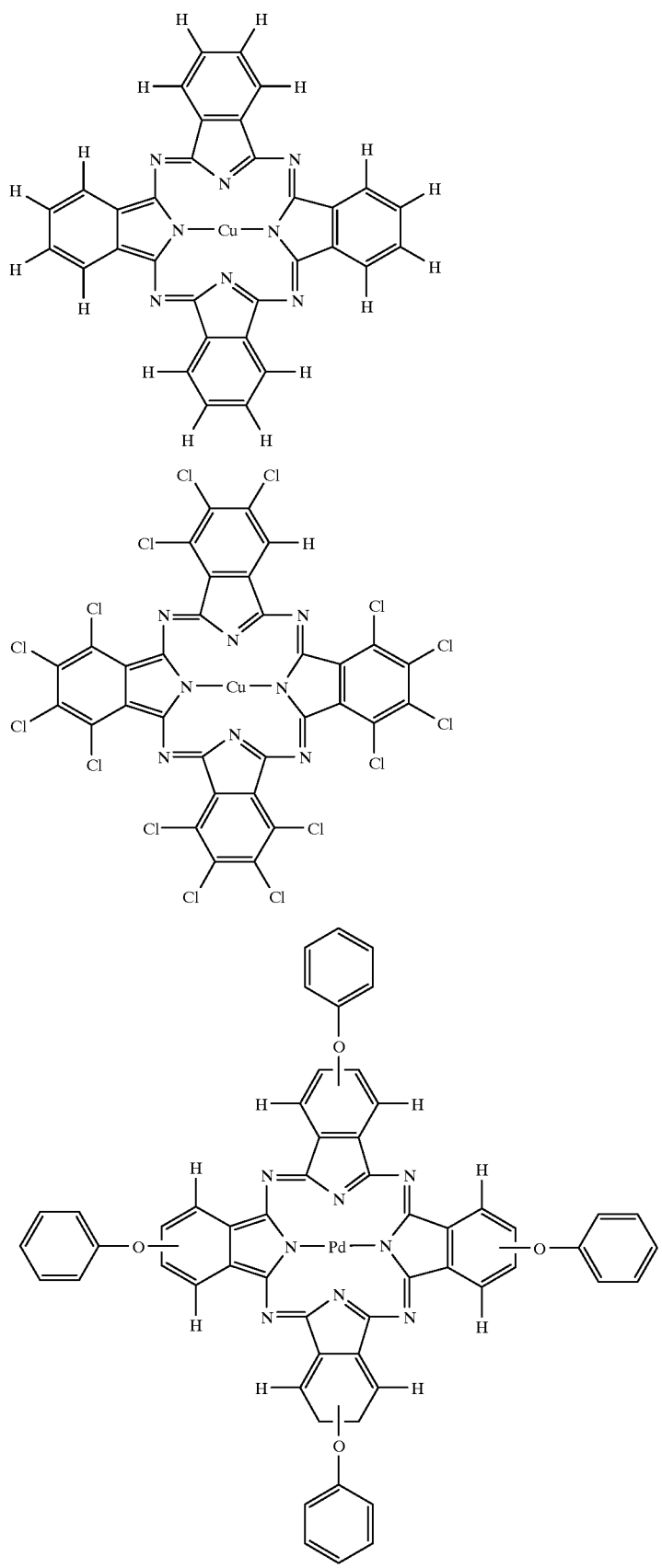

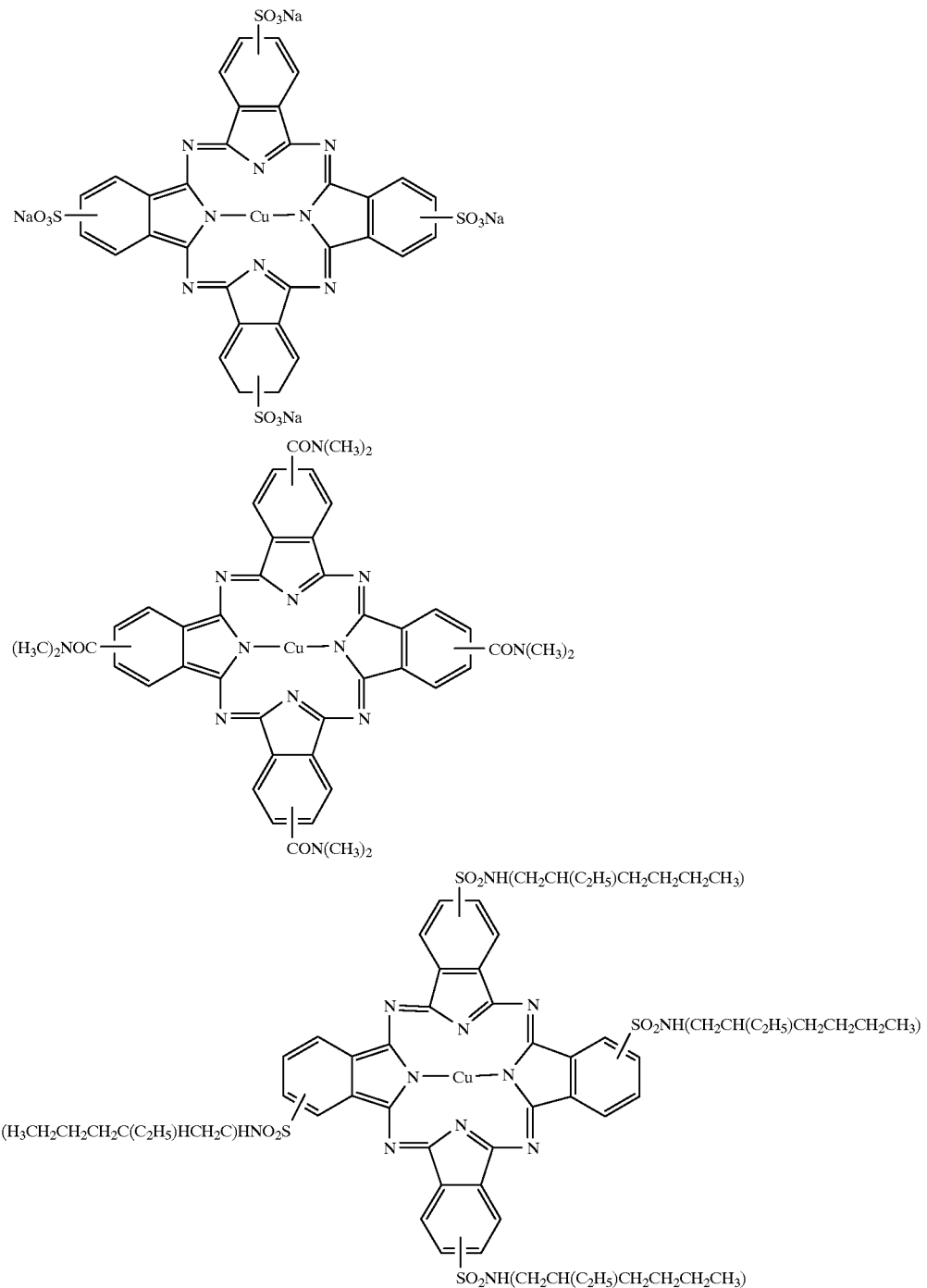
More preferred colorants include phthalocyanine compounds of the general formula (1) given below and naphthoquinone compounds of the general formula (2) or (3) given below, because they have high absorption wavelength selectivity and good durability.

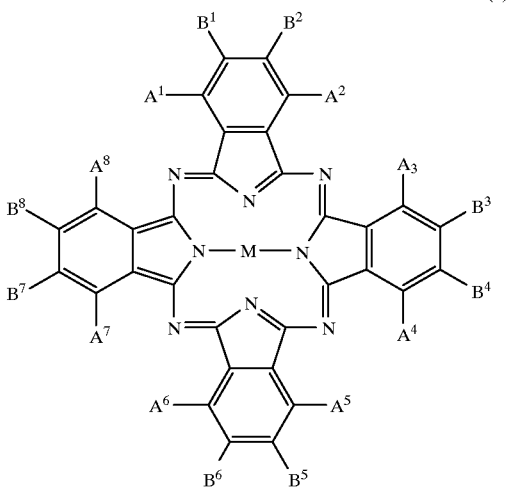

(1)

where each of $A^1$ to $A^8$ is independently a hydrogen atom or a halogen atom; each of $B^1$ to $B^8$ is independently a hydrogen atom, a halogen atom, a substituted or unsubstituted alkyl group, a substituted or unsubstituted alkoxy group, a substituted or unsubstituted aryl group, a substituted or unsubstituted aryloxy group, a substituted or unsubstituted alkylthio group or a substituted or unsubstituted arylthio group; and M is a divalent metal atom, a substituted trivalent or tetravalent metal atom, or an oxymetal group.

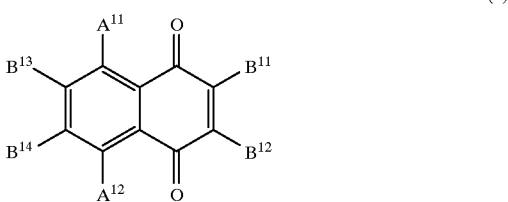

(2)

where each of $A^{11}$ and $A^{12}$ is independently an amino group, a substituted or unsubstituted alkylamino group, or a substituted or unsubstituted arylamino group; and each of $B^{11}$ to $B^{14}$ is independently a hydrogen atom, a halogen atom, a substituted or unsubstituted alkyl group, a substituted or unsubstituted alkoxy group, a substituted or unsubstituted aryl group, or a substituted or unsubstituted aryloxy group.

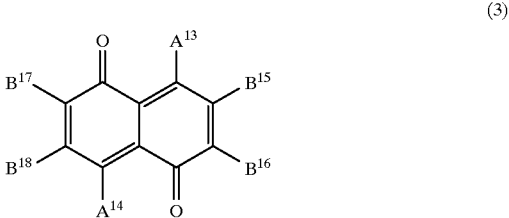

(3)

where each of $A^{13}$ and $A^{14}$ is independently an amino group, a substituted or unsubstituted alkylamino group, or a substituted or unsubstituted arylamino group; and each of $B^{15}$ to $B^{18}$ is independently a hydrogen atom, a halogen atom, a substituted or unsubstituted alkyl group, a substituted or unsubstituted alkoxy group, a substituted or unsubstituted aryl group, or a substituted or unsubstituted aryloxy group.

With regard to phthalocyanine compounds of the above formula (1), specific examples of the substituent groups represented by $A^1$ to $A^8$ and $B^1$ to $B^8$ and of the metal represented by M are given below.

Examples of the halogen atom include fluorine, chlorine, bromine and iodine atoms.

Examples of the substituted or unsubstituted alkyl group include straight-chain or branched alkyl groups of 1 to 20 carbon atoms, such as methyl, ethyl, n-propyl, isopropyl, n-butyl, isobutyl, sec-butyl, t-butyl, n-pentyl, isopentyl, neopentyl, 1,2-dimethylpropyl, n-hexyl, cyclohexyl, 1,3-dimethylbutyl, 1-isopropylpropyl, 1,2-dimethylbutyl, n-heptyl, 1,4-dimethylpentyl, 2-methyl-1-isopropylpropyl, 1-ethyl-3-methylbutyl, n-octyl, 2-ethylhexyl, 3-methyl-1-isopropylbutyl, 2-methyl-1-isopropyl, 1-t-butyl-2-methylpropyl and n-nonyl; alkoxyalkyl, alkoxyalkoxyalkyl and alkoxyalkoxyalkoxyalkyl groups such as methoxymethyl, methoxyethyl, ethoxyethyl, propoxyethyl, butoxyethyl, γ-methoxypropyl, γ-ethoxypropyl, methoxyethoxyethyl, ethoxyethoxyethyl, dimethoxymethyl, diethoxymethyl, dimethoxyethyl and diethoxyethyl; halogenated alkyl groups such as chloromethyl, 2,2,2-trichloroethyl, trifluoromethyl, 2,2,2-trichloroethyl and 1,1,1,3,3,3-hexafluoro-2-propyl; and alkylaminoalkyl, dialkylaminoalkyl, alkoxylcarbonylalkyl, alkylaminocarbonylalkyl and alkoxysulfonylalkyl groups.

Examples of the substituted or unsubstituted alkoxy group include straight-chain or branched alkoxy groups of 1 to 20 carbon atoms, such as methoxy, ethoxy, n-propyloxy, isopropyloxy, n-butyloxy, isobutyloxy, sec-butyloxy, t-butyloxy, n-pentyloxy, isopentyloxy, neopentyloxy, 1,2-dimethylpropyloxy, n-hexyloxy, cyclohexyloxy, 1,3-dimethylbutyloxy, 1-isopropylpropyloxy, 1,2-dimethylbutyloxy, n-heptyloxy, 1,4-dimethylpentyloxy, 2-methyl-1-isopropylpropyloxy, 1-ethyl-3-methylbutyloxy, n-octyloxy, 2-ethylhexyloxy, 3-methyl-1-isopropylbutyloxy, 2-methyl-1-isopropyloxy, 1-t-butyl-2-methylpropyloxy and n-nonyloxy; alkoxyalkoxy, alkoxyalkoxyalkoxy and alkoxyalkoxyalkoxyalkoxy groups such as methoxymethoxy, methoxyethoxy, ethoxyethoxy, propoxyethoxy, butoxyethoxy, γ-methoxypropyloxy, γ-ethoxypropyloxy, methoxyethoxyethoxy, ethoxyethoxyethoxy, dimethoxymethoxy, diethoxymethoxy, dimethoxyethoxy, diethoxyethoxy and butyloxyethoxyethoxy; halogenated alkoxy groups such as chloromethoxy, 2,2,2-trichloroethoxy, trifluoromethoxy, 2,2,2-trichloroethoxy and 1,1,1,3,3,3-hexafluoro-2-propyloxy; and alkylaminoalkoxy and dialkylaminoalkoxy groups such as dimethylaminoethoxy and diethylaminoethoxy.

Examples of the substituted or unsubstituted aryl group include phenyl, halogenated phenyl (e.g., chlorophenyl, dichlorophenyl, bromophenyl, fluorophenyl and iodophenyl), tolyl, xylyl, mesityl, ethylphenyl, methoxyphenyl, ethoxyphenyl and pyridyl groups.

Examples of the substituted or unsubstituted aryloxy group include phenoxy, napthoxy and alkylphenoxy groups.

Examples of the substituted or unsubstituted alkylthio group include straight-chain or branched alkylthio groups of 1 to 20 carbon atoms, such as methylthio, ethylthio, n-propylthio, isopropylthio, n-butylthio, isobutylthio, sec-butylthio, t-butylthio, n-pentylthio, isopentylthio, neopentylthio, 1,2-dimethylpropylthio, n-hexylthio, cyclohexylthio, 1,3-dimethylbutylthio, 1-isopropylpropylthio, 1,2-dimethylbutylthio, n-heptylthio, 1,4-dimethylpentylthio, 2-methyl-1-isopropylpropylthio, 1-ethyl-3-methylbutylthio, n-octylthio, 2-ethylhexylthio, 3-methyl-1-isopropylbutylthio, 2-methyl-1-isopropylthio, 1-t-butyl-2-methylpropylthio and n-nonylthio; alkoxyalkylthio, alkoxyalkoxyalkylthio and alkoxyalkoxyalkoxyalkylthio groups such as methoxymethylthio, methoxyethylthio, ethoxyethylthio, propoxyethylthio, butoxyethylthio, γ-methoxypropylthio, γ-ethoxypropylthio, methoxyethoxyethylthio, ethoxyethoxyethylthio, dimethoxymethylthio, diethoxymethylthio, dimethoxyethylthio and diethoxyethylthio; halogenated alkylthio groups such as chloromethylthio, 2,2,2-trichloroethylthio, trifluoromethylthio, 2,2,2-trichloroethylthio and 1,1,1,3,3,3-hexafluoro-2-propylthio; and alkylaminoalkylthio and dialkylaminoalkylthio groups such as dimethylaminoethylthio and diethylaminoethylthio. $GeBr_2$, $GeI_2$, $GeF_2$, $SnCl_2$, $SnBr_2$, $SnF_2$, $TiCl_2$, $TiBr_2$, $TiF_2$, $Si(OH)_2$, $Ge(OH)_2$, $Zr(OH)_2$, $Mn(OH)_2$, $Sn(OH)_2$, $TiR_2$, $CrR_2$, $SiR_2$, $SnR_2$, $GeR_2$ (in which each R is an alkyl, phenyl or naphthyl group or a derivative thereof), $Si(OR')_2$, $Sn(OR')_2$, $Ge(OR')_2$, $Ti(OR')_2$, $Cr(OR')_2$ (in which each R' is an alkyl, phenyl, naphthyl, trialkylsilyl or dialkylalkoxysilyl group or a derivative thereof), $Sn(SR'')_2$ and $Ge(SR'')_2$ (in which each R'' is an alkyl, phenyl or naphthyl group or a derivative thereof).

Examples of the oxymetal group include VO, MnO and TiO.

Among these phthalocyanine compounds, those in which the central metal M is Cu, Pd, AlCl, TiO or VO are especially preferred.

With regard to naphthoquinone compounds of the above formulae (2) and (3), specific examples of the substituent groups represented by $A^{11}$ to $A^{14}$ and $B^{11}$ to $B^{18}$ are given below.

Examples of the halogen atom include fluorine, chlorine, bromine and iodine atoms.

Examples of the substituted or unsubstituted alkyl group include straight-chain or branched alkyl groups such as methyl, ethyl, n-propyl, isopropyl, n-butyl, isobutyl, sec-butyl, t-butyl, n-pentyl, isopentyl and neopentyl.

Examples of the substituted or unsubstituted alkoxy group include straight-chain or branched alkoxy groups such as methoxy, ethoxy, n-propyloxy, isopropyloxy, n-butyloxy, isobutyloxy, sec-butyloxy, t-butyloxy, n-pentyloxy, isopentyloxy and neopentyloxy.

Examples of the substituted or unsubstituted aryl group include phenyl, halogenated phenyl (e.g., chlorophenyl, dichlorophenyl, bromophenyl, fluorophenyl and iodophenyl), tolyl, xylyl, mesityl, ethylphenyl, methoxyphenyl, ethoxyphenyl and pyridyl groups.

Examples of the substituted or unsubstituted aryloxy group include phenoxy, napthoxy, alkylphenoxy and alkoxyphenoxy groups.

Examples of the substituted or unsubstituted alkylamino group include methylamino, ethylamino, propylamino, butylamino, pentylamino, dipentylamino, hexylamino, heptylamino, octylamino and nonylamino groups.

Examples of the substituted or unsubstituted arylamino group include phenylamino, alkylphenylamino, alkoxyphenylamino, hydroxyphenylamino and naphthylamino groups.

On the other hand, the colorant used to adjust the A value to 1.3 or greater should preferably be one having an absorption maximum between 700 and 900 nm. Specific examples thereof include, but are not limited to, the following colorants:

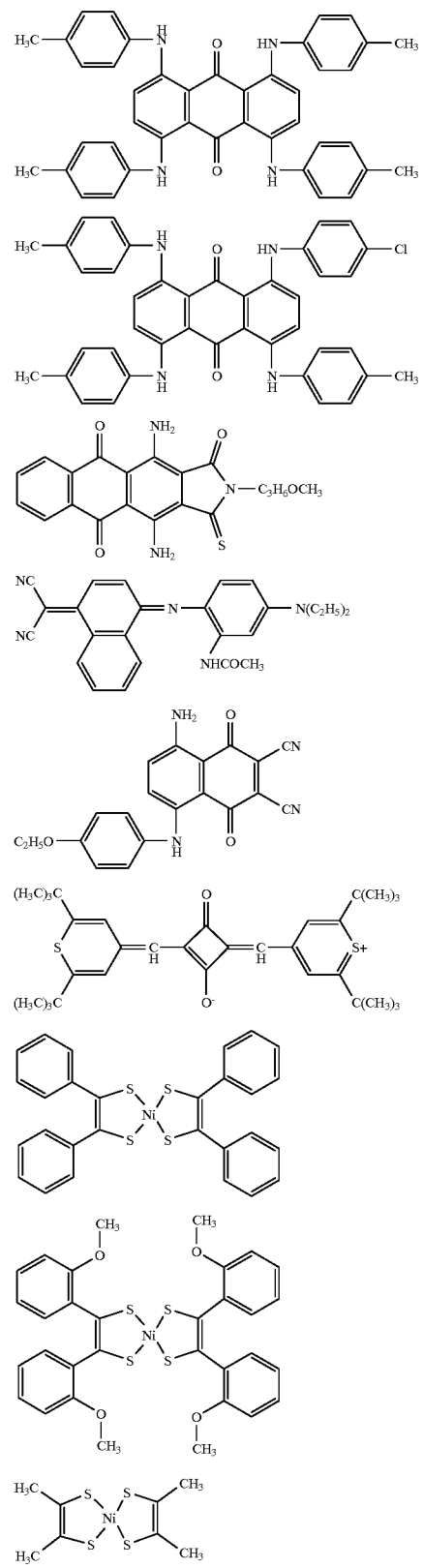

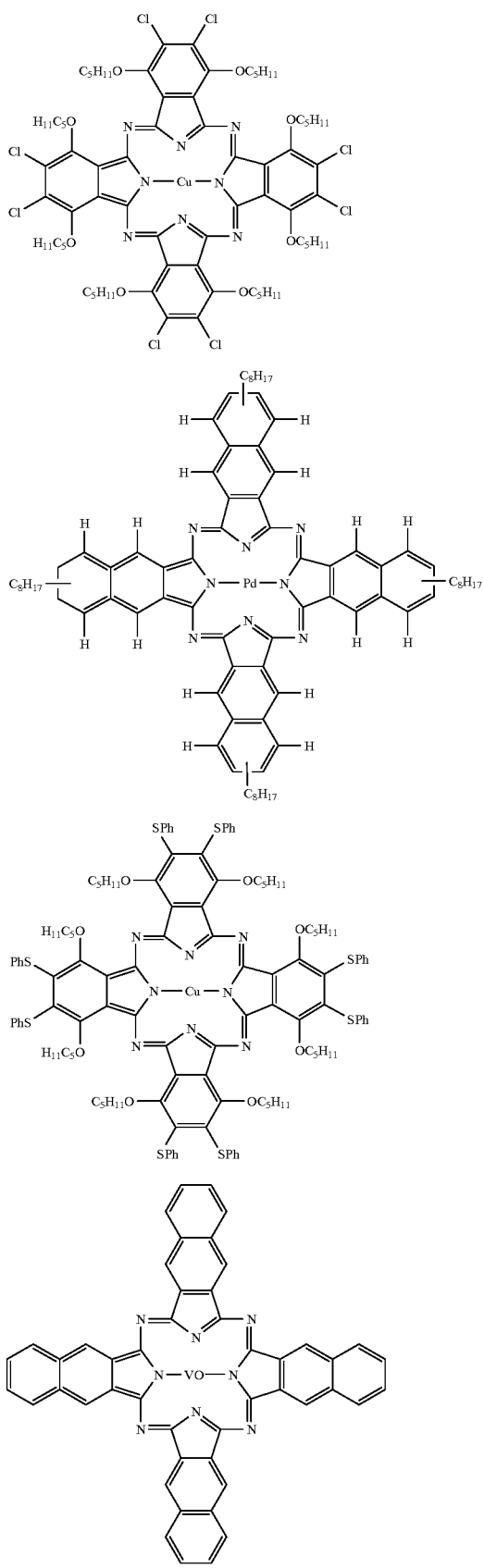

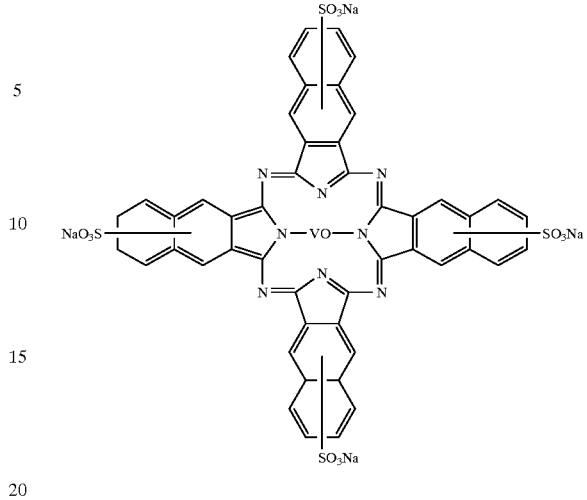

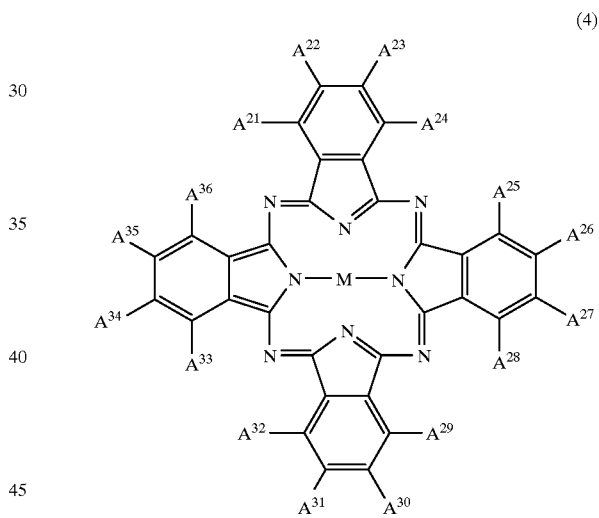

More preferred colorants include phthalocyanine compounds of the general formula (4) given below and naphthalocyanine compounds of the general formula (5) given below, because they have high absorption wavelength selectivity and good durability.

$$(4)$$

where each of $A^{21}$ to $A^{36}$ is independently a hydrogen atom, a halogen atom, a substituted or unsubstituted alkyl group, a substituted or unsubstituted alkoxy group, a substituted or unsubstituted aryl group, a substituted or unsubstituted aryloxy group, a substituted or unsubstituted alkylthio group, or a substituted or unsubstituted arylthio group; at least four of $A^{21}$, $A^{24}$, $A^{25}$, $A^{28}$, $A^{29}$, $A^{32}$, $A^{33}$ and $A^{36}$ are each a substituted or unsubstituted alkoxy group, a substituted or unsubstituted aryloxy group, a substituted or unsubstituted alkylthio group, or a substituted or unsubstituted arylthio group; each pair of $A^{21}$ and $A^{22}$, $A^{22}$ and $A^{23}$, $A^{23}$ and $A^{24}$, $A^{25}$ and $A^{26}$, $A^{26}$ and $A^{27}$, $A^{27}$ and $A^{28}$, $A^{29}$ and $A^{30}$, $A^{30}$ and $A^{31}$, $A^{31}$ and $A^{32}$, $A^{33}$ and $A^{34}$, $A^{34}$ and $A^{35}$, and $A^{35}$ and $A^{36}$ may independently form a ring through the medium of oxygen and/or sulfur atoms; and M is a divalent metal atom, a substituted trivalent or tetravalent metal atom, or an oxymetal group.

With regard to the ring formation by $A^{21}$ to $A^{36}$ in formula (4), at least one pair of adjacent substituent groups may form a ring in at least one of the blocks each having four substituent groups, i.e., $A^{21}$ to $A^{24}$, $A^{25}$ to $A^{28}$, $A^{29}$ to $A^{32}$ or $A^{33}$ to $A^{36}$. More specifically, when the block having $A^{21}$ to $A^{24}$ is taken as a typical example, the ring formation may occur in any of the following four embodiments.

(i) Only $A^{21}$ and $A^{22}$ form a ring.
(ii) Only $A^{23}$ and $A^{24}$ form a ring.
(iii) $A^{21}$ and $A^{22}$ form a ring and, at the same time, $A^{23}$ and $A^{24}$ form a ring.
(iv) Only $A^{22}$ and $A^{23}$ form a ring.

The same applies correspondingly to the ring formation by $B^{22}$ to $B^{43}$ which will be described later.

(5)

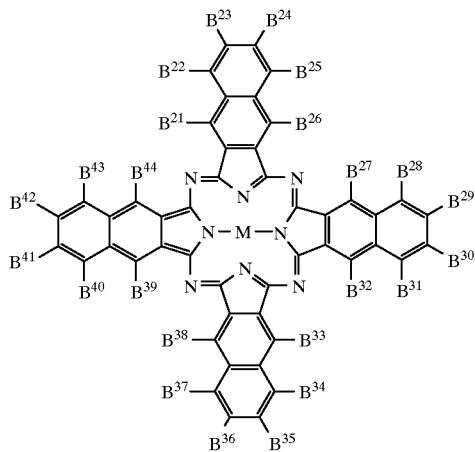

where each of $B^{21}$ to $B^{44}$ is independently a hydrogen atom, a halogen atom, a substituted or unsubstituted alkyl group, a substituted or unsubstituted alkoxy group, a substituted or unsubstituted aryl group, a substituted or unsubstituted aryloxy group, a substituted or unsubstituted alkylthio group, or a substituted or unsubstituted arylthio group; each pair of $B^{22}$ and $B^{23}$, $B^{23}$ and $B^{24}$, $B^{24}$ and $B^{25}$, $B^{28}$ and $B^{29}$, $B^{29}$ and $B^{30}$, $B^{30}$ and $B^{31}$, $B^{34}$ and $B^{35}$, $B^{35}$ and $B^{36}$, $B^{36}$ and $B^{37}$, $B^{40}$ and $B^{41}$, $B^{41}$ and $B^{42}$, and $B^{42}$ and $B^{43}$ may independently form a ring through the medium of oxygen and/or sulfur atoms; and M is a divalent metal atom, a substituted trivalent or tetravalent metal atom, or an oxymetal group.

With regard to phthalocyanine compounds of the above formula (4) and naphthalocyanine compounds of the above formula (5), specific examples of the halogen atom, substituted or unsubstituted alkyl group, substituted or unsubstituted alkoxy group, substituted or unsubstituted aryl group, substituted or unsubstituted aryloxy group, substituted or unsubstituted alkylthio group, and substituted or unsubstituted arylthio group which are represented by $A^{21}$ to $A^{36}$ and $B^{21}$ to $B^{44}$ are the same as enumerated above for the substituent groups represented by $B^1$ to $B^8$. Similarly, specific examples of the divalent metal atom, substituted trivalent or tetravalent metal atom, and oxymetal group which are represented by M are the same as enumerated above.

When each pair of $A^{21}$ and $A^{22}$, $A^{22}$ and $A^{23}$, $A^{23}$ and $A^{24}$, $A^{25}$ and $A^{26}$, $A^{26}$ and $A^{27}$, $A^{27}$ and $A^{28}$, $A^{29}$ and $A^{30}$, $A^{30}$ and $A^{31}$, $A^{31}$ and $A^{32}$, $A^{33}$ and $A^{34}$, $A^{34}$ and $A^{35}$, $A^{35}$ and $A^{36}$, $B^{22}$ and $B^{23}$, $B^{23}$ and $B^{24}$, $B^{24}$ and $B^{25}$, $B^{28}$ and $B^{29}$, $B^{29}$ and $B^{30}$, $B^{30}$ and $B^{31}$, $B^{34}$ and $B^{35}$, $B^{35}$ and $B^{36}$, $B^{36}$ and $B^{37}$, $B^{40}$ and $B^{41}$, $B^{41}$ and $B^{42}$, and $B^{42}$ and $B^{43}$ forms a ring through the medium of oxygen and/or sulfur atoms, specific examples of the substituent group so formed are as follows:

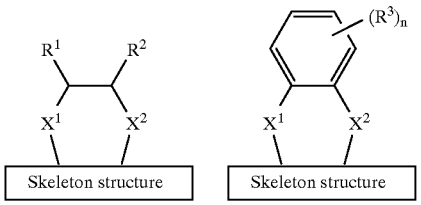

where each of $R^1$, $R^2$ and $R^3$ is a substituted or unsubstituted alkyl group or a substituted or unsubstituted aryl group, each of $X^1$ and $X^2$ is independently an oxygen or sulfur atom, and n is an integer of 1 to 4.

Among the above-described phthalocyanine compounds, those in which all of $A^{21}$, $A^{24}$, $A^{25}$, $A^{28}$, $A^{29}$, $A^{32}$, $A^{33}$ and $A^{36}$ are substituted or unsubstituted alkoxy groups are especially preferred, and those in which the central metal M is Cu, Pd, AlCl, TiO or VO are more preferred.

Among the above-described naphthalocyanine compounds, those in which all of $B^{21}$, $B^{26}$, $B^{27}$, $B^{32}$, $B^{33}$, $B^{38}$, $B^{39}$ and $B^{44}$ are hydrogen atoms are especially preferred, and those in which the central metal M is Cu, Pd, AlCl, TiO or VO are more preferred.

The covering materials of the present invention are made in the form of resin plates, films, glass or the like, and then processed as required. Although no particular limitation is placed on the method of making a covering material for plant growth control by using a colorant as described above, the following three methods may be employed by way of example. They include:

(1) a method which comprises blending a colorant with a resin, and hot-molding the resulting blend to form a resin plate or film;

(2) a method which comprises preparing a coating composition containing a colorant, and applying it to a transparent resin plate, transparent film or transparent glass plate; and (3) a method which comprises making a laminated resin plate, laminated resin film, laminated glass or the like by using an adhesive containing a colorant.

In the method (1) which comprises blending a colorant with a resin and hot-molding the resulting blend, the base resin should preferably be a resin which can be formed into a plate or film having as high transparency as possible. Specific examples thereof include the various resins which have been enumerated above for use as base materials in the present invention.

Although the processing temperature, film-forming conditions and the like may vary more or less according to the base resin used, this method is usually carried out as follows: A colorant is added to a base resin in the form of powder or pellets, and this mixture is melted by heating it to 150–350° C. This melt may be molded into a resin plate or formed into a film by means of an extruder. Alternatively, a film having a thickness of 10–200 μm may be formed by extruding the melt into a raw film and then stretching this raw film uniaxially or biaxially at 30–120° C. with a stretch ratio of 2–5. Moreover, melt casting, calendering and other techniques may also be employed. In the blending step, additives commonly used for purposes of resin molding, such as ultraviolet absorbers and plasticizers, may also be added to the base resin. Although the amount of colorant added may vary according to the thickness of the resin product being made, the desired absorptivity, the desired PPF transmittance and the like, it usually ranges from 1 ppm to 1%.

In the method (2) which comprises preparing a coating composition containing a colorant and applying it to a base material, a coating composition may be prepared by dissolving a colorant in a binder resin and an organic solvent. Alternatively, a water-based coating composition may be prepared by dissolving a water-soluble colorant directly in an acrylic emulsion, water-based urethane paint or the like, or by pulverizing a water-insoluble colorant to a particle size of several micrometers or less and then dispersing it in an acrylic emulsion, water-based urethane paint or the like. In the former case, the binder resin may usually be selected from aliphatic ester resins, acrylic resins, melamine resins, urethane resins, aromatic ester resins, polycarbonate resins, aliphatic polyolefin resins, aromatic polyolefin resins, polyvinyl resins, polyvinyl alcohol resin, modified polyvinyl resins (e.g., PVB and EVA) and copolymer resins thereof.

The solvent may be selected from halogenated hydrocarbons, alcohols, ketones, esters, aliphatic hydrocarbons, aromatic hydrocarbons, ethers and mixtures thereof.

Although the concentration of the colorant may vary according to the thickness of the coating, the desired absorptivity, the desired PPF transmittance and the like, it is usually in the range of 0.1 to 30% by weight based on the weight of the binder resin.

The concentration of the binder resin is usually in the range of 1 to 50% by weight based on the total weight of the coating composition. In the latter case, a water-based coating composition may likewise be prepared by dissolving a colorant, or dispersing a pulverized colorant (having a particle size of 50 to 500 nm), in an uncolored acrylic emulsion, water-based urethane paint or the like. This coating composition may further contain additives commonly used in coating compositions, such as ultraviolet absorbers and antioxidants. Then, a covering material for plant growth control may be made by applying the coating composition prepared in the above-described manner to a transparent resin film, transparent resin plate or transparent glass by means of a bar coater, blade coater, spin coater, reverse coater, die coater, spray coater or the like. In order to protect the coated surface, a protective layer may be formed on the coated surface, or a transparent resin plate, transparent resin film or the like may be laminated to the coated surface. Furthermore, a cast film may also be used in this method.

In the method (3) which comprises making a laminated resin plate, laminated resin film, laminated glass or the like by using an adhesive containing a colorant, there may be used common silicone, urethane and acrylic adhesives for use with resins, and well-known transparent adhesives for use in laminated glass, such as polyvinyl butyral (PVB) and ethylene-vinyl acetate (EVA) adhesives. Covering materials for plant growth control may be made by bonding resin plates together, a resin film to a resin plate, a resin plate to a glass plate, resin films together, a resin film to a glass plate, or glass plates together, with the aid of an adhesive containing 0.1 to 30% of a colorant. Alternatively, such covering materials may also be made by thermocompression bonding.

Although no particular limitation is placed on the type of plants to be covered with the covering materials of the present invention, such plants include, for example, vegetables of the families Cucurbitaceae, Solanaceae, Leguminosae, Rosaceae, Cruciferae, Compositae, Umbelliferae, Chenopodiaceae, Gramineae, Malvaceae, Araceae, Labiatae, Zingiberaceae, Nymphaeceae and Araliaceae; flowering plants (including cut flowers and pot flowers) of the families Compositae, Rosaceae, Araceae, Caryophyllaceae, Cruciferae, Plumbaginaceae, Gentianaceae, Scrophulariaceae, Leguminosae, Iridaceae, Solanaceae, Amaryllidaceae, Orchidaceae, Cornaceae, Rubiaceae, Salicaceae, Ericaceae, Oleaceae, Magnoliaceae, Primulaceae, Begoniaceae, Labiatae, Geraniaceae, Crassulaceae, Ranunculaceae, Gesneriaceae and Cactaceae, of the order Filices, and of the families Araliaceae, Moraceae, Commelinaceae, Bromeliaceae, Marantaceae, Euphorbiaceae, Piperaceae, Saxifragaceae, Oenotheraceae, Malvaceae, Myrtaceae, Theaceae and Nyctaginaceae; fruit trees of the families Rosaceae, Vitaceae, Moraceae, Ebenaceae, Ericaceae, Lardizabalaceae, Actinidiaceae, Passifloraceae, Rutaceae, Anacardiaceae, Bromeliaceae and Myrtaceae; and algae.

Specific examples thereof include the sunflower (*Helianthus annuus*), cucumber (*Cucumis sativis*), lettuce (*Lactuca sativa*), cabbage (*Brassica oleracea*), sesame (*Sesamum indicum*), green pepper (*Capsicum annuum*), eggplant (*Solanum melongena*), *Brassica campestris*, trefoil (*Cryptotaenia canadensis*), spinach (*Spinacia oleracea*), pumpkin (*Cucurbita moschata*), watermelon (*Citrullus battich*), melon (*Cucumis mels*), *Doliclos lablab*, broccoli, strawberry (*Fragaria chiloensis*), mandarin orange (*Citrus unshiu*), pear (*Pyrus serotina*), grape (*Vitis vinifera*), chrysanthemum (*Chrysanthemum morifolium*), onion (*Allium cepa*), tomato (*Lycopersicon esculentum*), snapdragon (*Antirrhinum majus*), carnation (*Dianthus caryophyllus*), *Lamium amplexicaule*, rose (Rosa sp.), limonium, *Matthiola incana*, eustoma, orchid, cyclamen (*Cyclamen persicum*), impatiens, marigold, salvia, delphinium, larkspur, didiscus, *Ammi majus*, lily (Lilium sp.), freesia (*Freesia reflacta*), iris, primrose (*Primula sieboldi*), begonia, *Chrysanthemum coronarium*, butterbur (*Petasites japonicus*), leek (*Allium tuberosum*), welsh onion (*Allium tuberosum*), asparagus (*Asparagus officinalis*), celery (*Apium qravelens*), Japanese radish (*Raphanus sativus*), *Pisum sativum* and loquat (*Eriobotrya japonica*).

No particular limitation is placed on the method for applying the covering materials of the present invention to horticultural facilities, provided that it enables plants to be surrounded with such a covering material on all sides or on at least one side where light is admitted. Typical examples thereof include the method of fabricating a glass or plastic house by using a resin plate or glass made in the above-described manner and hence serving to control plant growth, the method of using a resin film as an outer covering and/or inner lining for pipe houses and vinyl houses, the method of using a resin film for tunnel houses, and the method of using a resin film as a mulching film. In the case of fruit trees, not only each tree may be entirely surrounded with a covering material, but also its branches may be separately covered therewith.

In private gardening, the covering materials of the present invention may suitably be used, for example, according to methods equivalent to those employed for horticultural facilities, and the method of covering potted plants with a small-sized box made of a resin plate.

When some covering materials in accordance with the present invention were subjected to growth tests on various types of seedlings, there were obtained plants whose growth was significantly controlled as compared with the case in which they were exposed to natural light.

EXAMPLES

The present invention is further illustrated by the following examples. However, these examples are not to be construed to limit the scope of the present invention.

In the following Examples, the degrees of growth promotion and growth retardation were calculated based on the plant heights.

Example 1

4.2 parts of a phthalocyanine colorant represented by formula (6) and 100,000 parts of polymethyl methacrylate were melt-blended at 280° C., and the resulting blend was extrusion-molded to form a colored resin plate having a thickness of 2.5 mm and a width of 1 m. When the photosynthetically effective photon flux (PPF) transmittance and A value of this resin plate were measured with a spectrophotometer (UV-3100; manufactured by Shimazu Seisakusho K.K.), they were found to be 73.3% and 0.58 (based on standard illuminant D65), respectively. Using this resin plate, a growth cabinet having a height of 650 mm, a width of 1,750 mm and a depth of 850 mm was made. In the following cultivation, this growth cabinet was placed outdoors and ventilated at a rate of 15.2 $M^3$/min with an air fan so that the internal temperature would be equal to the temperature of the open air. Seven sunflower seedlings having a height of about 8 cm were placed in the above growth cabinet and cultivated for 10 days. As a result, they grew to be tall plants having, on the average, a plant height of 26.3±0.7 cm, a stem length of 22.1±0.7 cm and a first internode length of 18.7±0.5 cm.

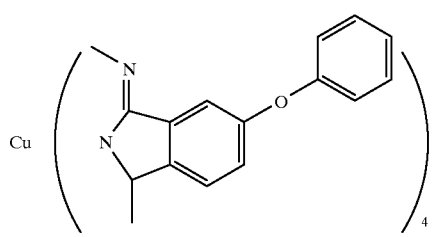

(6)

For purposes of comparison, cultivation was also carried out under exactly the same conditions, except that a growth cabinet made of a resin plate containing no colorant was used by covering it with cheese cloth so as to give a photosynthetically effective photon flux (PPF) transmittance of 73.0% (and an A value of 1.05). The plants thus obtained had, on the average, a plant height of 17.6±0.7 cm, a stem length of 14.4±0.8 cm and a first internode length of 10.6±0.6 cm. Thus, it was confirmed that the degree of growth promotion (in elongation) of sunflower plants achieved with the aforesaid covering material having an A value of 0.58 was about 1.5 as compared with the resin plate having an almost equal PPF transmittance but containing no colorant.

Moreover, when a light resistance test was carried out by irradiating the above colored resin plate at 63° C. with a carbon arc lamp for 300 hours, it exhibited a PPF transmittance of 74.0% and an A value of 0.59, indicating that these values were scarcely deteriorated as compared with those before the light resistance test.

Example 2

A colored resin plate was formed in the same manner as in Example 1, except that 4.0 parts of a colorant represented by formula (7) was used in place of the colorant of Example 1. This resin plate had a photosynthetically effective photon flux (PPF) transmittance of 73.2% and an A value of 0.65. Using this resin plate, sunflower seedlings were cultivated in exactly the same manner as in Example 1. As a result, they grew to be tall plants having, on the average, a plant height of 25.1±0.7 cm, a stem length of 21.5±0.6 cm and a first internode length of 17.8±0.6 cm. Thus, it was confirmed that the degree of growth promotion (in elongation) of sunflower plants achieved with the aforesaid covering material having an A value of 0.65 was about 1.4 as compared with the comparative resin plate of Example 1.

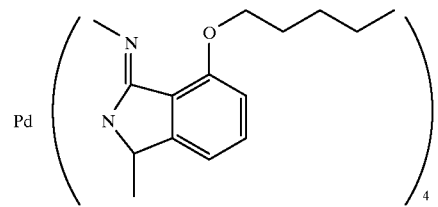

(7)

Example 3

2.0 parts of a colorant represented by formula (8) was dissolved in 1,000 parts of polyvinyl butyral resin at 180° C. Using a film-forming machine, this blend was formed into a colored film having a width of 3 m and a thickness of 0.2 mm. Subsequently, this film was interposed between two float glass plates having a thickness of 3 mm and the resulting assembly was pressed at 140° C. and 13 atmospheres for 20 minutes to form laminated glass. This laminated glass had a photosynthetically effective photon flux (PPF) transmittance of 73.1% and an A value of 0.60. Using this resin plate, a growth cabinet having a height of 650 mm, a width of 650 mm and a depth of 650 mm was made. When three sunflower seedlings were cultivated in the same manner as in Example 1, they grew to be tall plants having, on the average, a plant height of 25.7±0.4 cm, a stem length of 22.2±0.3 cm and a first internode length of 17.9±0.2 cm. Thus, it was confirmed that the degree of growth promotion (in elongation) of sunflower plants achieved with the aforesaid covering material having an A value of 0.60 was 1.5 as compared with the comparative resin plate of Example 1.

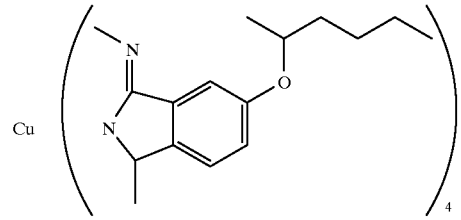

(8)

Example 4

A blend of 1.0 part of the phthalocyanine colorant of Example 1 and 1,000 parts of vinyl chloride for agricultural use was calendered at 180° C. to form a colored resin film having a thickness of 100 μm. This resin film had a photosynthetically effective photon flux (PPF) transmittance of 72.8% and an A value of 0.67. Using this resin film, a growth cabinet having a height of 650 mm, a width of 1,750 mm and a depth of 850 mm was made. When sunflower seedlings were cultivated in the same manner as in Example 1, they grew to be tall plants having, on the average, a plant height of 24.2±0.5 cm, a stem length of 20.8±0.4 cm and a first internode length of 17.5±0.3 cm. Thus, it was confirmed that the degree of growth promotion (in elongation) of sunflower plants achieved with the aforesaid covering material having an A value of 0.67 was 1.4 as compared with the comparative resin plate of Example 1.

Example 5

A liquid composed of Yuban SE-60 (manufactured by Mitsui Toatsu Chemicals, Inc.) and Almatex 748-5M (manufactured by Mitsui Toatsu Chemicals, Inc.) in a ratio of 3:7 was mixed with toluene containing 1% of the phthalocyanine colorant of Example 2 in a ratio of 2:1. The resulting mixture was applied to a polyethylene terephthalate film having a thickness of 75 $\mu$m and dried at 130° C. for 15 minutes. This film had a photosynthetically effective photon flux (PPF) transmittance of 73.2% and an A value of 0.55. When sunflower seedlings were cultivated in the same manner as in Example 1, they grew to be tall plants having, on the average, a plant height of 26.9±0.8 cm, a stem length of 22.0±0.6 cm and a first internode length of 19.4±0.5 cm. Thus, it was confirmed that the degree of growth promotion (in elongation) of sunflower plants achieved with the aforesaid covering material having an A value of 0.55 was 1.5 as compared with the comparative resin plate of Example 1.

Example 6

Phthalocyanine Green was pulverized to a particle diameter of 0.2 $\mu$m or less, and an acrylic emulsion coating composition containing 1% by weight of this Phthalocyanine Green was prepared. This coating composition was applied to a vinyl chloride film for agricultural use. The resulting colored resin film had a photosynthetically effective photon flux (PPF) transmittance of 69.3% and an A value of 0.66. When sunflower seedlings were cultivated in the same manner as in Example 1, they grew to be tall plants having, on the average, a plant height of 24.8±0.7 cm, a stem length of 19.7±0.5 cm and a first internode length of 16.9±0.3 cm.

Example 7

Phthalocyanine Blue was pulverized to a particle diameter of 0.2 $\mu$m or less, and an acrylic emulsion coating composition containing 1% by weight of this Phthalocyanine Blue was prepared. This coating composition was applied to a vinyl chloride film for agricultural use. The resulting colored resin film had a photosynthetically effective photon flux (PPF) transmittance of 70.5% and an A value of 0.69. When sunflower seedlings were cultivated in the same manner as in Example 1, they grew to be tall plants having, on the average, a plant height of 23.8±0.6 cm, a stem length of 18.7±0.6 cm and a first internode length of 16.7±0.4 cm.

Example 8

Seven cucumber seedlings having a height of about 6 cm were placed in the growth cabinet made of a colored resin plate and used in Example 1, and cultivated for 9 days. As a result, they grew to be tall plants having, on the average, a plant height of 29.4±1.0 cm, a stem length of 19.5±0.5 cm and a first internode length of 6.1±0.5 cm.

For purposes of comparison, cultivation was also carried out under exactly the same conditions, except that a resin plate containing no colorant (and having a PPF transmittance of 92.2% and an A value of 1.05) was used. The plants thus obtained had, on the average, a plant height of 22.1±1.4 cm, a stem length of 11.5±1.2 cm and a first internode length of 2.9±0.2 cm. Thus, it was confirmed that the degree of growth promotion of cucumber plants achieved with the covering material having an A value of 0.58 was about 1.3 as compared with the resin plate containing no colorant.

Example 9

A colored resin plate was formed in the same manner as in Example 1, except that 4.0 parts of a naphthoquinone colorant represented by formula (9) was used in place of the colorant of Example 1. This resin plate had a photosynthetically effective photon flux (PPF) transmittance of 73.3% and an A value of 0.71. Using this resin plate, sunflower seedlings were cultivated in exactly the same manner as in Example 1. As a result, they grew to be tall plants having, on the average, a plant height of 23.5±0.7 cm, a stem length of 20.0±0.6 cm and a first internode length of 16.5±0.5 cm. Thus, it was confirmed that the degree of growth promotion (in elongation) of sunflower plants achieved with the aforesaid covering material having an A value of 0.71 was about 1.3 as compared with the comparative resin plate of Example 1.

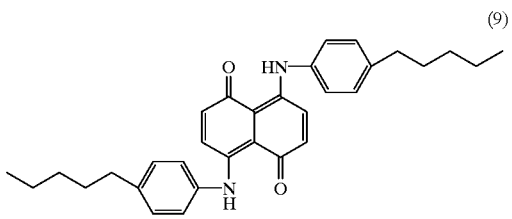

(9)

Example 10

A colored resin plate was formed in the same manner as in Example 1, except that 4.0 parts of a colorant represented by formula (10) was used in place of the colorant of Example 1. This resin plate had a photosynthetically effective photon flux (PPF) transmittance of 73.2% and an A value of 0.69. Using this resin plate, sunflower seedlings were cultivated in exactly the same manner as in Example 1. As a result, they grew to be tall plants having, on the average, a plant height of 24.1±0.7 cm, a stem length of 20.5±0.6 cm and a first internode length of 16.8±0.6 cm. Thus, it was confirmed that the degree of growth promotion (in elongation) of sunflower plants achieved with the aforesaid covering material having an A value of 0.69 was about 1.4 as compared with the comparative resin plate of Example 1.

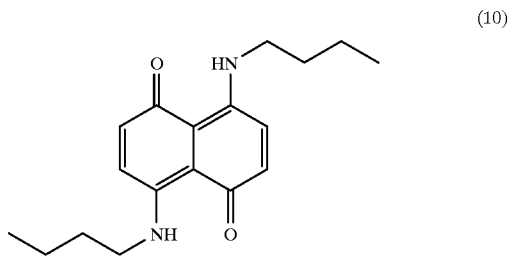

(10)

Example 11

A colored resin film having a thickness of 100 $\mu$m was formed in the same manner as in Example 4, except that 1.0 part of a colorant represented by formula (11) was used in place of the colorant of Example 4. This resin film had a photosynthetically effective photon flux (PPF) transmittance of 72.8% and an A value of 0.75. Using this resin film, sunflower seedlings were cultivated in the same manner as in Example 4. As a result, they grew to be tall plants having, on the average, a plant height of 23.2±0.4 cm, a stem length of 18.8±0.4 cm and a first internode length of 15.5±0.3 cm. Thus, it was confirmed that the degree of growth promotion (in elongation) of sunflower plants achieved with the aforesaid covering material having an A value of 0.75 was 1.3 as compared with the comparative resin plate of Example 1.

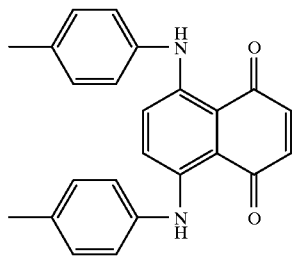

(11)

Example 12

Seven cucumber seedlings having a height of about 6 cm were placed in the growth cabinet made of a colored resin plate and used in Example 9, and cultivated for 9 days. The plants thus obtained had, on the average, a plant height of 26.4±1.2 cm, a stem length of 16.5±0.5 cm and a first internode length of 4.9±0.5 cm. Thus, it was confirmed that the degree of growth promotion of cucumber plants achieved with the covering material having an A value of 0.71 was about 1.2 as compared with the comparative resin plate of Example 8.

Example 13

A colored resin plate was formed in the same manner as in Example 1, except that 4.2 parts of a phthalocyanine colorant represented by formula (12) was used in place of the colorant of Example 1. This resin plate had a photosynthetically effective photon flux (PPF) transmittance of 76.3% and an A value of 2.19. Using this resin plate, sunflower seedlings were cultivated in exactly the same manner as in Example 1. As a result, there were obtained dwarf and robust plants having, on the average, a plant height of 10.8±0.8 cm, a stem length of 8.1±0.4 cm and a first internode length of 5.4±0.4 cm.

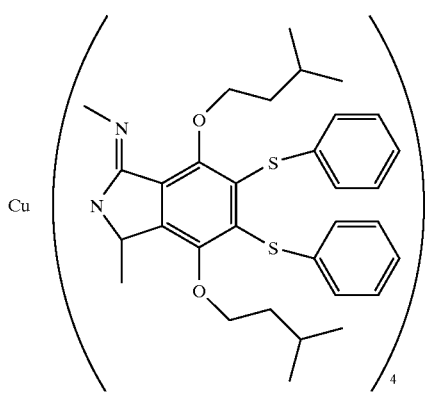

(12)

For purposes of comparison, cultivation was also carried out under exactly the same conditions, except that a resin plate containing no colorant was used by covering it with cheese cloth so as to give a photosynthetically effective photon flux (PPF) transmittance of 76.0% (and an A value of 1.05). The plants thus obtained had, on the average, a plant height of 17.5±0.7 cm, a stem length of 14.3±0.8 cm and a first internode length of 10.5±0.6 cm. Thus, it was confirmed that the degree of growth retardation of sunflower plants achieved with the aforesaid covering material having an A value of 2.19 was about 0.6 as compared with the resin plate having an almost equal PPF transmittance but containing no colorant.

Moreover, when a light resistance test was carried out by irradiating the above colored resin plate at 63° C. with a carbon arc lamp for 300 hours, it exhibited a PPF transmittance of 77.3% and an A value of 2.09, indicating that these values were scarcely deteriorated as compared with those before the light resistance test.

Example 14

A colored resin plate was formed in the same manner as in Example 1, except that 4.0 parts of a colorant represented by formula (13) was used in place of the colorant of Example 1. This resin plate had a photosynthetically effective photon flux (PPF) transmittance of 76.2% and an A value of 1.99. Using this resin plate, sunflower seedlings were cultivated in exactly the same manner as in Example 13. As a result, there were obtained dwarf and robust plants having, on the average, a plant height of 11.1±0.7 cm, a stem length of 8.8±0.4 cm and a first internode length of 5.4±0.4 cm. Thus, it was confirmed that the degree of growth retardation of sunflower plants achieved with the aforesaid covering material having an A value of 1.99 was about 0.6 as compared with the comparative resin plate of Example 13.

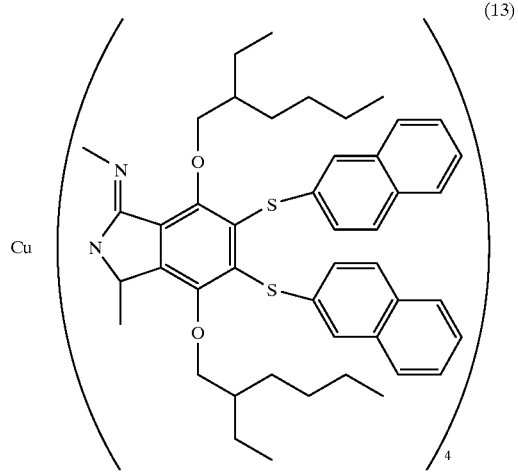

(13)

Example 15

Laminated glass was formed in the same manner as in Example 3, except that 2.0 parts of a colorant represented by formula (14) was used in place of the colorant of Example 3. This laminated glass had a photosynthetically effective photon flux (PPF) transmittance of 78.9% and an A value of 1.60. When sunflower seedlings were cultivated in exactly the same manner as in Example 3, there were obtained plants having, on the average, a plant height of 13.2±0.4 cm, a stem length of 9.6±0.3 cm and a first internode length of 6.4±0.2 cm.

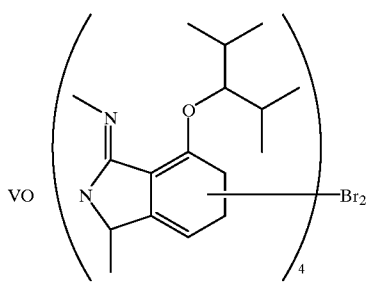

(14)

For purposes of comparison, cultivation was also carried out under exactly the same conditions, except that the resin plate containing no colorant and used in Example 1 for purposes of comparison was used by covering it with cheese cloth so as to give a photosynthetically effective photon flux (PPF) transmittance of 78.8% (and an A value of 1.05). The plants thus obtained had, on the average, a plant height of 17.1±0.7 cm, a stem length of 13.5±0.4 cm and a first internode length of 10.2±0.6 cm. Thus, it was confirmed that the degree of growth retardation of sunflower plants achieved with the aforesaid covering material having an A value of 1.60 was 0.8 as compared with the resin plate having an almost equal PPF transmittance but containing no colorant.

Example 16

A colored resin film having a thickness of 100 μm was formed in the same manner as in Example 4, except that 1.0 part of a phthalocyanine colorant represented by formula (15) was used in place of the colorant of Example 4. This resin film had a photosynthetically effective photon flux (PPF) transmittance of 76.0% and an A value of 1.49. Using this resin film, sunflower seedlings were cultivated in exactly the same manner as in Example 4. As a result, there were obtained dwarf and robust plants having, on the average, a plant height of 13.2±0.5 cm, a stem length of 9.8±0.4 cm and a first internode length of 6.7±0.3 cm. Thus, it was confirmed that the degree of growth retardation of sunflower plants achieved with the aforesaid covering material having an A value of 1.49 was 0.8 as compared with the comparative re6in plate of Example 13.

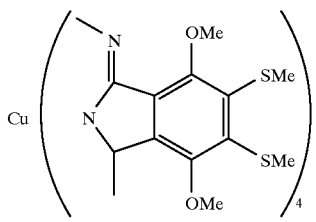

(15)

Example 17

A coating film was formed in the same manner as in Example 5, except that a colorant represented by formula (16) was used in place of the colorant of Example 5. This film had a photosynthetically effective photon flux (PPF) transmittance of 76.2% and an A value of 1.50. When sunflower seedlings were cultivated in exactly the same manner as in Example 5, there were obtained dwarf and robust plants having, on the average, a plant height of 13.9±0.4 cm, a stem length of 10.0±0.5 cm and a first internode length of 6.4±0.3 cm. Thus, it was confirmed that the degree of growth retardation of sunflower plants achieved with the aforesaid covering material having an A value of 1.50 was 0.8 as compared with the comparative resin plate of Example 13.

Example 18

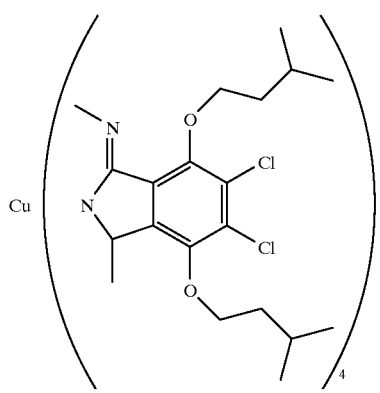

(16)

A mixture of 4.0 parts of a naphthalocyanine colorant represented by formula (17) and 1,000 parts of polyethylene terephthalate was melted at 300° C. and extrusion-molded to form a film having a thickness of 100 μm. Then, this film was biaxially stretched to obtain a colored resin film having a thickness of 25 μm. This film had a photosynthetically effective photon flux (PPF) transmittance of 77.3% and an A value of 2.00. When sunflower seedlings were cultivated in exactly the same manner as in Example 13, there were obtained dwarf and robust plants having, on the average, a plant height of 11.9±0.6 cm, a stem length of 9.5±0.5 cm and a first internode length of 5.8±0.4 cm. Thus, it was confirmed that the degree of growth retardation of sunflower plants achieved with the aforesaid covering material having an A value of 2.00 was 0.7 as compared with the comparative resin plate of Example 13.

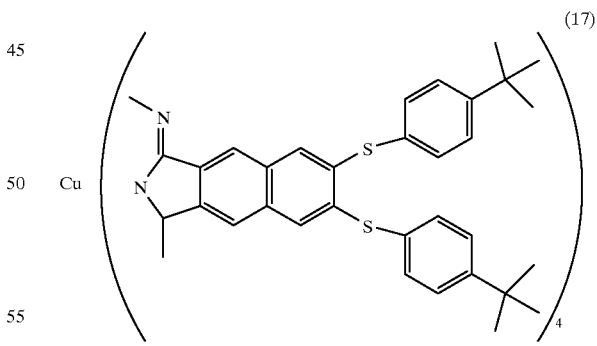

(17)

Example 19

A naphthalocyanine colorant represented by formula (18) was pulverized to a particle diameter of 0.2 μm or less, and an acrylic emulsion coating composition containing 1% by weight of this naphthalocyanine colorant was prepared. This coating composition was applied to a vinyl chloride film for agricultural use. The resulting colored resin film had a photosynthetically effective photon flux (PPF) transmittance of 70.3% and an A value of 1.70. When sunflower seedlings were cultivated in exactly the same manner as in Example 13, there were obtained dwarf and robust plants having, on the average, a plant height of 12.0±0.7 cm, a stem length of 9.7±0.5 cm and a first internode length of 5.9±0.3 cm.

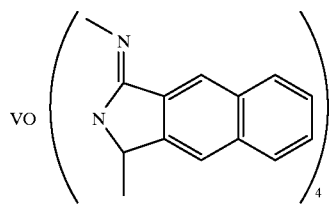

(18)

Example 20

Seven cucumber seedlings having a height of about 6 cm were placed in the growth cabinet made of a colored resin plate and used in Example 13, and cultivated for 9 days. The plants thus obtained had, on the average, a plant height of 12.4±1.0 cm, a stem length of 6.5±0.5 cm and a first internode length of 1.5±0.5 cm. Thus, it was confirmed that the degree of growth retardation of cucumber plants achieved with the covering material having an A value of 2.19 was about 0.6 as compared with the comparative resin plate of Example 8.

Example 21

Using a twin-screw extruder, 1.5 parts of the naphthalocyanine colorant of Example 19 and 1,000 parts of polyethylene (V5993; manufactured by Mitsui DuPont Co., Ltd.) were blended at 200° C. and formed into pellets. Then, using a single screw extruder fitted with a T-die, these pellets were melt-extruded to form a film having a thickness of 100 μm. This film had a photosynthetically effective photon flux (PPF) transmittance of 75.2% and an A value of 1.53. When sunflower seedlings were cultivated in exactly the same manner as in Example 4, there were obtained dwarf and robust plants having, on the average, a plant height of 13.2±0.6 cm, a stem length of 9.6±0.3 cm and a first internode length of 6.6±0.4 cm. Thus, it was confirmed that the degree of growth retardation of sunflower plants achieved with the aforesaid covering material having an A value of 1.53 was 0.8 as compared with the comparative resin plate of Example 1.

Example 22

Growth promotion tests on other types of plants were carried out in the same manner as in Example 1. The results thus obtained are shown in Table 1.

TABLE 1

| Type of plant | Effectiveness | Type of plant | Effectiveness | Type of plant | Effectiveness |
|---|---|---|---|---|---|
| Lettuce | ○ | Mandarin orange | ○ | Eustoma | ○ |
| Cabbage | ○ | Pear | ○ | Orchid | ○ |
| Sesame | ○ | Grape | Δ | Cyclamen | ○ |
| Green pepper | ○ | Chrysanthemum | ○ | Impatiens | ○ |
| Eggplant | Δ | Onion | Δ | Marigold | ○ |
| Brassica campestris | Δ | Tomato | Δ | Salvia | ○ |
| Trefoil | Δ | Snapdragon | ○ | Limonium | ○ |

TABLE 1-continued

| Type of plant | Effectiveness | Type of plant | Effectiveness | Type of plant | Effectiveness |
|---|---|---|---|---|---|
| Spinach | ○ | Carnation | Δ | Delphinium | ○ |
| Pumpkin | ○ | Lamium amplexicaule | ○ | Larkspur | ○ |
| Watermelon | ○ | Rose | ○ | Didiscus | ○ |
| Melon | ○ | | | Ammi majus | ○ |
| Strawberry | ○ | Matthiola incana | Δ | | |

○: When the degree of growth promotion was 1.3 or greater.
Δ: When the degree of growth promotion was from 1.1 to less than 1.3.

Example 23

Growth retardation tests on other types of plants were carried out in the same manner as in Example 13. The results thus obtained are shown in Table 2.

TABLE 2

| Type of plant | Effectiveness | Type of plant | Effectiveness | Type of plant | Effectiveness |
|---|---|---|---|---|---|
| Lettuce | ○ | Mandarin orange | ○ | Eustoma | ○ |
| Cabbage | ○ | Pear | ○ | Orchid | ○ |
| Sesame | ○ | Grape | Δ | Cyclamen | ○ |
| Green pepper | ○ | Chrysanthemum | ○ | Impatiens | ○ |
| Eggplant | Δ | Onion | Δ | Marigold | ○ |
| Brassica campestris | Δ | Tomato | Δ | Salvia | ○ |
| Trefoil | Δ | Snapdragon | ○ | Limonium | ○ |
| Spinach | ○ | Carnation | Δ | Delphinium | ○ |
| Pumpkin | ○ | Lamium amplexicaule | ○ | Larkspur | ○ |
| Watermelon | ○ | Rose | ○ | Didiscus | ○ |
| Melon | ○ | | | Ammi majus | ○ |
| Strawberry | ○ | Matthiola incana | ○ | | |

○: When the degree of growth retardation was 0.7 or less.
Δ: When the degree of growth retardation was from 0.9 to greater than 0.7.

Comparative Example 1

Cultivation was carried out under exactly the same conditions as in Example 1, except that the growth cabinet made of a resin plate containing no colorant and used in Example 1 was used by covering it with cheese cloth so as to give a photosynthetically effective photon flux (PPF) transmittance of 20.0% (and an A value of 1.05). As a result, there were obtained immature plants having little chlorophyll.

What is claimed is:
1. A method for controlling plant growth comprising exposing a plant to light passing through a covering material comprised of a polymeric resin containing a colorant having an absorption maximum between 600 and 700 nm or between 700 and 900 nm wherein the covering material has a photosynthetically effective photon flux (PPF) transmittance in the wavelength range of 400 to 700 nm of 50% or greater when light is passed therethrough, and an A value of 0.9 or less chosen so as to promote growth of the plant or of 1.3 or greater chosen so as to retard the growth of the plant, the A value being defined by the following equation:

$$A = R/Fr$$

wherein R is the photon flux of red light in the wavelength range of 600 to 700 nm and Fr is the photon flux of far red light in the wavelength range of 700 to 800 nm.

2. The method for controlling plant growth of claim 1 wherein the covering material has a photosynthetically effective photon flux (PPF) transmittance of 50% or greater when light is passed therethrough, and an A value of 0.9 or less, so that said covering material serves to promote plant growth.

3. The method for controlling plant growth of claim 2 wherein the covering material has at least one phthalocyanine compound of the following general formula (1) and which has a photosynthetically effective photon flux (PPF) transmittance of 50% or greater when light is passed therethrough, and an A value of 0.9 or less:

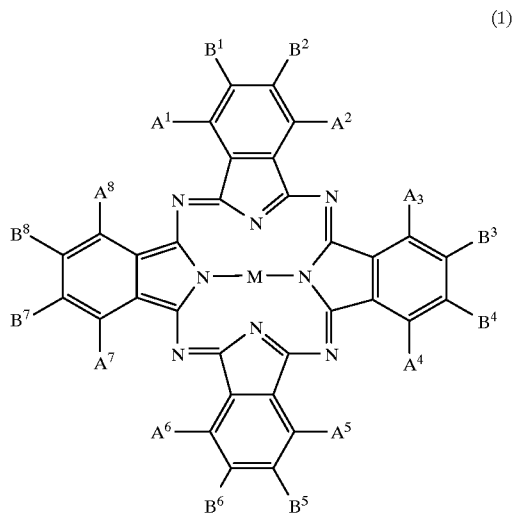

(1)

where each of $A^1$ to $A^8$ is independently a hydrogen atom or a halogen atom; each of $B^1$ to $B^8$ is independently a hydrogen atom, a halogen atom, a substituted or unsubstituted alkyl group, a substituted or unsubstituted alkoxy group, a substituted or unsubstituted aryl group, a substituted or unsubstituted aryloxy group, a substituted or unsubstituted alkylthio group or a substituted or unsubstituted arylthio group; and M is a divalent metal atom, a substituted trivalent or tetravalent metal atom, or an oxymetal group.

4. The method for controlling plant growth of claim 2 wherein the covering material has at least one naphthoquinone compound of the following general formula (2) or (3) and which has a photosynthetically effective photon flux (PPF) transmittance of 50% or greater when light is passed therethrough, and an A value of 0.9 or less:

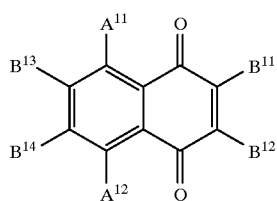

(2)

where each of $A^{11}$ and $A^{12}$ is independently an amino group, a substituted or unsubstituted alkylamino group, or a substituted or unsubstituted arylamino group; and each of $B^{11}$ and $B^{14}$ is independently a hydrogen atom, a halogen atom, a substituted or unsubstituted alkyl group, a substituted or unsubstituted alkoxy group, a substituted or unsubstituted aryl group, or a substituted or unsubstituted aryloxy group;

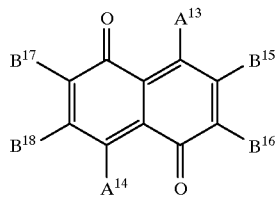

(3)

where each of $A^{13}$ and $A^{14}$ is independently an amino group, a substituted or unsubstituted alkylamino group, or a substituted or unsubstituted arylamino group; and each of $B^{15}$ to $B^{18}$ is independently a hydrogen atom, a halogen atom, a substituted or unsubstituted alkyl group, a substituted or unsubstituted alkoxy group, a substituted or unsubstituted aryl group, or a substituted or unsubstituted aryloxy group.

5. The method for controlling plant growth of claim 3 wherein M in the phthalocyanine compound of the general formula (1) is Cu, Pd, AlCl, TiO or VO.

6. The method for controlling plant growth of claim 1 wherein the covering material has a photosynthetically effective photon flux (PPF) transmittance of 50% or greater when light is passed therethrough, and an A value of 1.3 or greater, so that said covering material serves to retard plant growth.

7. The method for controlling plant growth of claim 6 wherein the covering material has at least one of a phthalocyanine compound of the following general formula (4) and a naphthalocyanine compound of the following general formula (5) and which has a photosynthetically effective photon flux (PPF) transmittance of 50% or greater when light is passed therethrough. and an A value of 1.3 or greater:

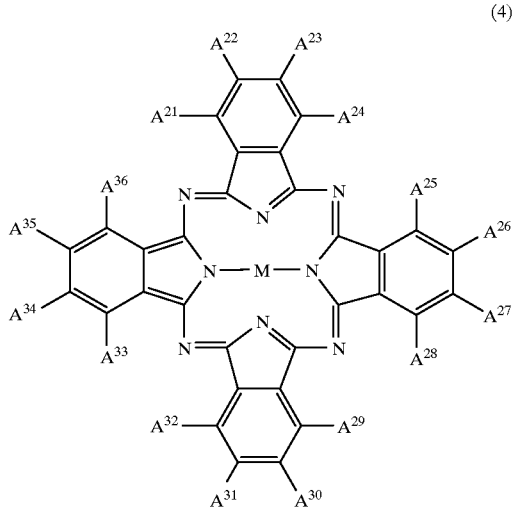

(4)

where each of $A^{21}$ to $A^{36}$ is independently a hydrogen atom, a halogen atom, a substituted or unsubstituted alkyl group, a substituted or unsubstituted alkoxy group, a substituted or unsubstituted aryl group, a substituted or unsubstituted aryloxy group, a substituted or unsubstituted alkylthio group, or a substituted or unsubstituted arylthio group; at least four of $A^{21}$, $A^{24}$, $A^{25}$, $A^{28}$, $A^{29}$, $A^{32}$, $A^{33}$ and $A^{36}$ are each a substituted or unsubstituted alkoxy group, a substituted or unsubstituted aryloxy group, a substituted or unsubstituted alkylthio group, or a substituted or unsubstituted arylthio group; each pair of $A^{21}$ and $A^{22}$, $A^{22}$ and $A^{23}$, $A^{23}$ and $A^{24}$, $A^{25}$ and $A^{26}$, $A^{26}$ and $A^{27}$, $A^{27}$ and $A^{28}$, $A^{29}$ and $A^{30}$, $A^{30}$ and $A^{31}$, $A^{31}$ and $A^{32}$, $A^{33}$ and $A^{34}$, $A^{34}$ and $A^{35}$ and $A^{35}$ and $A^{36}$ may independently form a ring through the medium of oxygen and/or sulfur atoms; and M is a divalent metal atom, a substituted trivalent or tetravalent metal atom or an oxymetal group;

(5)

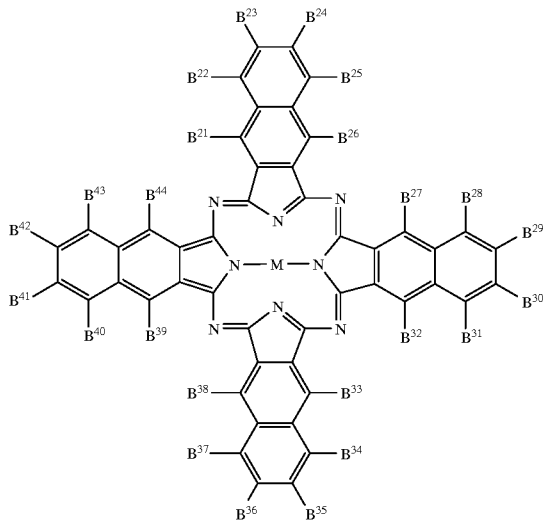

where each of $B^{21}$ to $B^{44}$ is independently a hydrogen atom, a halogen atom, a substituted or unsubstituted alkyl group, a substituted or unsubstituted alkoxy group, a substituted or unsubstituted aryl group, a substituted or unsubstituted aryloxy group, a substituted or unsubstituted alkylthio group, or a substituted or unsubstituted arylthio group; each pair of $B^{22}$ and $B^{23}$, $B^{23}$ and $B^{24}$, $B^{24}$ and $B^{25}$, $B^{28}$ and $B^{29}$, $B^{29}$ and $B^{30}$, $B^{30}$ and $B^{31}$, $B^{34}$ and $B^{35}$, $B^{35}$ and $B^{36}$, $B^{36}$ and $B^{37}$, $B^{40}$ and $B^{41}$, $B^{41}$ and $B^{42}$ and $B^{42}$ and $B^{43}$ may independently form a ring through the medium of oxygen and/or sulfur atoms; and M is a divalent metal atom, a substituted trivalent or tetravalent metal atom, or an oxymetal group.

8. The method for controlling plant growth of claim 7 wherein all of $A^{21}$, $A^{24}$, $A^{25}$, $A^{28}$, $A^{29}$, $A^{32}$, $A^{33}$ and $A^{36}$ are substituted or unsubstituted alkoxy groups.

9. The method for controlling plant growth of claim 7 wherein all of $B^{21}$, $B^{26}$, $B^{27}$, $B^{32}$, $B^{33}$, $B^{38}$, $B^{39}$ and $B^{44}$ are hydrogen atoms.

10. The method for controlling plant growth of claim 9 wherein M is Cu, Pd, AlCl, TiO or VO.

11. The method for controlling plant growth of claim 7 wherein M is Cu, Pd, AlCl, TiO or VO.

12. The method for controlling plant growth of claim 8 wherein M is Cu, Pd, AlCl, TiO or VO.

13. The method for controlling plant growth of claim 1 wherein natural light is passed through the covering material.

14. The method of controlling plant growth of claim 1 wherein the covering material has a photosynthetically effective photon flux (PPF) transmittance of 65% or greater.

15. The method of controlling plant growth of claim 1 wherein the covering material has a photosynthetically effective photon flux (PPF) transmittance of 70% or greater.

* * * * *

UNITED STATES PATENT AND TRADEMARK OFFICE
CERTIFICATE OF CORRECTION

PATENT NO. : 5,953,857
DATED : September 21, 1999
INVENTOR(S) : Ichiro AIGA et al.

It is certified that error appears in the above-identified patent and that said Letters Patent is hereby corrected as shown below:

Column 32, line 3, change "AlCI" to --AlCl--.

Signed and Sealed this

First Day of May, 2001

Attest:

NICHOLAS P. GODICI

Attesting Officer     *Acting Director of the United States Patent and Trademark Office*